(12) United States Patent
Heo

(10) Patent No.: US 11,458,557 B2
(45) Date of Patent: Oct. 4, 2022

(54) APPARATUS FOR SOLDERING A TERMINAL ON WINDOW GLASS FOR A VEHICLE AND A METHOD THEREOF

(71) Applicant: SAINT-GOBAIN GLASS FRANCE, Courbevoie (FR)

(72) Inventor: Un Haeng Heo, Gunsan-si (KR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 51 days.

(21) Appl. No.: 16/765,082

(22) PCT Filed: Nov. 30, 2018

(86) PCT No.: PCT/KR2018/015066
§ 371 (c)(1),
(2) Date: May 18, 2020

(87) PCT Pub. No.: WO2019/108006
PCT Pub. Date: Jun. 6, 2019

(65) Prior Publication Data
US 2020/0353551 A1 Nov. 12, 2020

(30) Foreign Application Priority Data
Nov. 30, 2017 (KR) .................. 10-2017-0163478

(51) Int. Cl.
*B23K 1/00* (2006.01)
*B23K 3/00* (2006.01)
(Continued)

(52) U.S. Cl.
CPC ............ *B23K 3/0475* (2013.01); *B23K 1/002* (2013.01); *B23K 1/0016* (2013.01); *B23K 37/04* (2013.01);
(Continued)

(58) Field of Classification Search
CPC .... B23K 3/0475; B23K 1/0016; B23K 1/002; B23K 37/04; B23K 2101/36;
(Continued)

(56) References Cited

U.S. PATENT DOCUMENTS 4,359,620 A * 11/1982 Keller .................. H05B 6/365
219/659
6,793,120 B2 * 9/2004 Johnson ............... B23K 1/0053
228/122.1
(Continued)

FOREIGN PATENT DOCUMENTS

| CN | 101065993 A | 10/2007 |
|---|---|---|
| CN | 101290145 A | 10/2008 |

(Continued)

OTHER PUBLICATIONS

Office Action as issued in Chinese Patent Application No. 201880003552.4, dated May 7, 2020.
(Continued)

*Primary Examiner* — Kiley S Stoner
(74) *Attorney, Agent, or Firm* — Pillsbury Winthrop Shaw Pittman LLP (57) ABSTRACT

An apparatus for soldering a terminal to which a solder alloy is attached on window glass for a vehicle, includes a terminal to which the solder alloy is attached; a coil unit including a coil which generates induction heat; a gripper which grips and releases the terminal and is configured to be movable upward and downward relative to the coil unit in a state of gripping the terminal; and a ferrite core unit including a ferrite core which is configured to be surrounded by the coil unit to receive the induction heat, and is configured to be movable upward and downward relative to the coil unit, wherein the solder alloy attached to the terminal, in a state of being in contact with the window glass, is melted by the (Continued)

induction heat from the coil unit and the ferrite core unit such that the terminal is attached to the window glass.

17 Claims, 5 Drawing Sheets

(51) Int. Cl.
| | | |
|---|---|---|
| *B23K 3/047* | (2006.01) | |
| *B23K 1/002* | (2006.01) | |
| *B23K 37/04* | (2006.01) | |
| *B62D 65/14* | (2006.01) | |
| *H01R 43/02* | (2006.01) | |
| *B23K 101/36* | (2006.01) | |
| *B23K 103/00* | (2006.01) | |
| *B23K 101/00* | (2006.01) | |
| *B60J 1/00* | (2006.01) | |
| *B60S 1/02* | (2006.01) | |

(52) U.S. Cl.
CPC ......... *B62D 65/14* (2013.01); *H01R 43/0207* (2013.01); *H01R 43/0263* (2013.01); *B23K 2101/006* (2018.08); *B23K 2101/36* (2018.08); *B23K 2103/54* (2018.08); *B60J 1/002* (2013.01); *B60S 1/023* (2013.01)

(58) Field of Classification Search
CPC .......... B23K 2103/54; B23K 2101/006; B23K 2103/18; B23K 1/19; B62D 65/14; H01R 43/0207; H01R 43/0263; H01R 33/97; H01R 43/0235; H01R 2201/26; B60J 1/002; B60S 1/023
USPC ..................... 219/615–616; 228/122.1–124.7
See application file for complete search history.

(56) References Cited

U.S. PATENT DOCUMENTS

| | | | | |
|---|---|---|---|---|
| 7,159,756 | B2* | 1/2007 | Winter .................. | B23K 35/02 219/203 |
| 9,997,846 | B1* | 6/2018 | Salter ....................... | H01R 4/04 |
| 2008/0164248 | A1* | 7/2008 | Reul ........................ | H05B 3/84 219/617 |
| 2010/0326983 | A1* | 12/2010 | Sitterlet ............. | B23K 37/0443 219/635 |
| 2011/0062148 | A1 | 3/2011 | Shashwat et al. | |
| 2011/0277906 | A1* | 11/2011 | Schmitt ............... | B29C 66/9231 156/64 |
| 2013/0043066 | A1* | 2/2013 | Cholewa .................. | H05K 1/11 174/257 |
| 2013/0206230 | A1* | 8/2013 | Sridharan ............... | H01L 23/10 136/259 |
| 2014/0158424 | A1* | 6/2014 | Schlarb .............. | B23K 35/0244 174/94 R |
| 2014/0170913 | A1* | 6/2014 | Degen .................. | B23K 1/0056 439/887 |
| 2014/0183181 | A1* | 7/2014 | Ash ........................ | B23K 1/002 219/616 |
| 2015/0024642 | A1* | 1/2015 | Ash ........................ | H01R 13/02 439/884 |
| 2015/0048078 | A1 | 2/2015 | Morf et al. | |
| 2015/0162677 | A1* | 6/2015 | Schmalbuch .......... | C22C 38/04 439/81 |
| 2015/0236431 | A1* | 8/2015 | Schmalbuch .......... | H01R 12/53 174/252 |
| 2015/0264800 | A1* | 9/2015 | Schmalbuch .......... | H01R 12/57 174/257 |
| 2016/0183330 | A1 | 6/2016 | Sigl | |
| 2017/0033481 | A1* | 2/2017 | Schmalbuch ...... | H01R 13/2442 |
| 2017/0265254 | A1* | 9/2017 | Schall .................. | B23K 26/351 |
| 2017/0297130 | A1* | 10/2017 | Jenrich ................ | B23K 35/264 |
| 2018/0050404 | A1* | 2/2018 | Gleisberg ............. | B23K 1/0006 |
| 2018/0183157 | A1* | 6/2018 | Schneider ................ | H01R 4/02 |
| 2019/0357316 | A1* | 11/2019 | Douma .................... | H05B 3/06 |
| 2020/0305683 | A1* | 10/2020 | Schoeler ............. | B23K 1/0008 |

FOREIGN PATENT DOCUMENTS

| | | |
|---|---|---|
| CN | 102407753 A | 4/2012 |
| CN | 104368889 A | 2/2015 |
| CN | 105643043 A | 6/2016 |
| EP | 2 060 546 A1 | 5/2009 |
| JP | 2002065455 A * | 3/2002 |
| JP | 2003-316276 A | 11/2003 |
| JP | 2006-192658 A | 7/2006 |
| JP | 2011-025257 A | 2/2011 |
| JP | 2011-056876 A | 3/2011 |
| JP | 2012-243903 A | 12/2012 |
| KR | 10-2011-0099686 A | 9/2011 |
| KR | 10-2016-0020299 A | 2/2016 |
| KR | 20-2017-0002656 U | 7/2017 |
| TW | 201735752 A | 10/2017 |
| WO | WO 2006/011461 A1 | 2/2006 |
| WO | WO 2011/151885 A1 | 12/2011 |
| WO | WO 2015/129758 A1 | 9/2015 |
| WO | WO 2016/098769 A1 | 6/2016 |

OTHER PUBLICATIONS

Second Office Action as issued in Chinese Patent Application No. 201880003552.4, dated Feb. 2, 2021.
Third Office Action as issued in Chinese Patent Application No. 201880003552.4 dated Jun. 11, 2021.
International Search Report as issued in International Patent Application No. PCT/KR2018/015066, dated Mar. 20, 2019.
First Examination Report as issued in Indian Patent Application No. 202017008242, dated Mar. 23, 2022.
First Notice of Preliminary Rejection as issued in Korean Patent Application No. 10-2017-0163478, dated Mar. 28, 2022.
Examination Report as issued in Indian Patent Application No. 202017008989, dated Mar. 30, 2022.
Notice of Reasons for Rejection as issued in Japanese Patent Application No. 2019-505433, dated May 24, 2022.
Second Notice of Preliminary Rejection as issued in Korean Patent Application No. 10-2019-7003442, dated Feb. 21, 2022.

* cited by examiner

APPARATUS FOR SOLDERING A TERMINAL ON WINDOW GLASS FOR A VEHICLE AND A METHOD THEREOF

CROSS-REFERENCE TO RELATED APPLICATIONS

This application is the U.S. National Stage of PCT/KR2018/015066, filed Nov. 30, 2018, which in turn claims priority to Korean patent application number 10-2017-0163478 filed Nov. 30, 2017. The content of these applications are incorporated herein by reference in their entireties.

TECHNICAL FIELD

The present invention relates to an apparatus for soldering a terminal on window glass for a vehicle, and a method thereof.

More specifically, this invention relates to an apparatus for soldering a terminal on window glass for a vehicle and a method thereof using an induction coil and a ferrite core.

INVENTION TECHNICAL BACKGROUND

A conductive layer having a pattern such as a defogger for removing fog, a deicer for removing ice and snow, and an antenna for receiving radio waves is often formed on a surface of window glass mounted on a vehicle, especially window glass mounted on a rear of a vehicle.

In this case, an external power source or a metallic terminal for connection with the antenna circuit is soldered to a terminal connection part of the conductive layer.

However, in the conventional soldering process, the terminal and a solder alloy are placed on the window glass, and the solder alloy is melted using a heated a soldering iron.

Likewise, when soldering on window glass using a soldering iron, heat generated from the soldering iron is directly transferred to a specific part of the window glass, so thermal stress is generated in the window glass, and residual stress is present even after the solder alloy is cooled which may cause a problem that the window glass may shatter.

In order to solve such a problem, the applicant has developed an apparatus for soldering a terminal on window glass for a vehicle through inductively heating a solder alloy attached to a terminal by using an induction coil without using a soldering iron while soldering a terminal, and filed an application of Korean Laid-Open Utility Model Publication No. 20-2017-0002656.

However, when soldering is performed using a soldering apparatus using an induction coil as described above, there are problems that all of the flux is burned while the solder alloy that is pre-attached to the terminal is melted in the induction coil, the molten solder may solidify before going down to the target area (busbar), or the quality of the soldering is affected by the external environment because the melted solder is exposed to the air.

PRECEDENT TECHNICAL LITERATURE

Patent Literature

Korean Laid-Open Utility Model Publication No. 20-2017-0002656 (published on Jul. 25, 2017).

CONTENTS OF THE INVENTION

Problem to Solved

It is an object of the present invention to provide an apparatus for soldering a terminal and a method thereof in which an induction coil and a ferrite core are used together to melt a solder directly in a target area in order to solve the above conventional technical problems.

Technical Solution

In order to solve above technical problems, the present invention may provide an apparatus for soldering a terminal on window glass for a vehicle, the apparatus comprising: a terminal to which solder alloy is attached; a coil unit comprising a coil which generates induction heat; a gripper which grips and releases the terminal and is configured to be movable upward and downward relative to the coil unit in a state of gripping the terminal; and a ferrite core unit comprising a ferrite core which is configured to be surrounded by the coil unit to receive the induction heat, and is configured to be movable upward and downward relative to the coil unit, wherein the solder alloy attached to the terminal, in a state of being in contact with the window glass, is melted by the induction heat from the coil unit and the ferrite core unit such that the terminal is attached to the window glass.

Here, the solder alloy attached to the terminal may be melted by induction heat while the ferrite core unit is pressing the terminal.

In addition, the coil unit may comprise one coil, and the ferrite core unit may comprise one ferrite core.

In addition, when the ferrite core unit comprises at least two ferrite cores, the at least two ferrite cores may be disposed such that a minimum distances between each ferrite core and the coils are the same.

In addition, when the ferrite core unit comprises one ferrite core, the ferrite core may be disposed such that a distance from a closest facing part of the coil and a distance from an opposite facing part of the coil are the same.

In addition, the coil may be shaped to be downwardly convex when viewed laterally.

In addition, with reference to the distance from the terminal to the lowest part of the downwardly convex coil during induction heating, the coil may be shaped such that a remaining part of the coil is curved upwardly to be away from the lowest part by higher than 30% of the distance.

In addition, the area of the terminal that the ferrite core unit presses and contacts may be 75~80% of the vertically projected area of the terminal.

In addition, the gripper may be made of a plastic material which is not affected by the induction heat.

The present invention may also provide a method of soldering a terminal on window glass for a vehicle, the method comprising: transferring a terminal to which a solder alloy is attached from a terminal supply unit to a target of the window glass; securing the terminal by vertical contact with a ferrite core unit comprising a ferrite core which is configured to be surrounded by a coil unit comprising a coil which generates induction heat; melting the solder alloy, in a state of being in contact with the window glass, by the induction heat from the coil unit and the ferrite core unit and then placing the terminal on the window glass; and removing the coil unit and the ferrite core unit from the terminal after the solder alloy is solidified.

Effect of the Invention

Since the apparatus for soldering a terminal on window glass for a vehicle and a method thereof of the present invention uses the induction coil and the ferrite core together to melt the solder directly in the target area, it is possible to solve the problem that all of the flux is burned while the solder alloy that is pre-attached to the terminal is melted in the induction coil, it is possible to solve the problem of solidification of the melted solder before it goes down to the target area (busbar), and since the melted solder is not exposed to the air, the soldering quality is not greatly affected by the external environment such that good quality can be maintained.

In addition, the apparatus for soldering a terminal on window glass for a vehicle and a method thereof according to the present invention may reduce the amount of electric power required for induction heating by 30 to 35% by preventing unnecessary induction heating energy waste.

DETAILED DESCRIPTION OF THE INVENTION

Hereinafter, preferred embodiments of the present invention will be described in detail with reference to the accompanying drawings. First, in adding reference numerals to the constituent elements of the drawings, it is to be noted that the same constituent elements are denoted by the same reference numerals even though they are shown in different drawings. In addition, in describing of the present embodiment, a detailed description of known configurations or functions will be omitted if it is determined that the gist of the present embodiment may be made unclear.

It is an object of the present invention to provide an apparatus for soldering a terminal and a method thereof in which solder is directly melted in a target region by using an induction coil and a ferrite core together.

Figure 1:
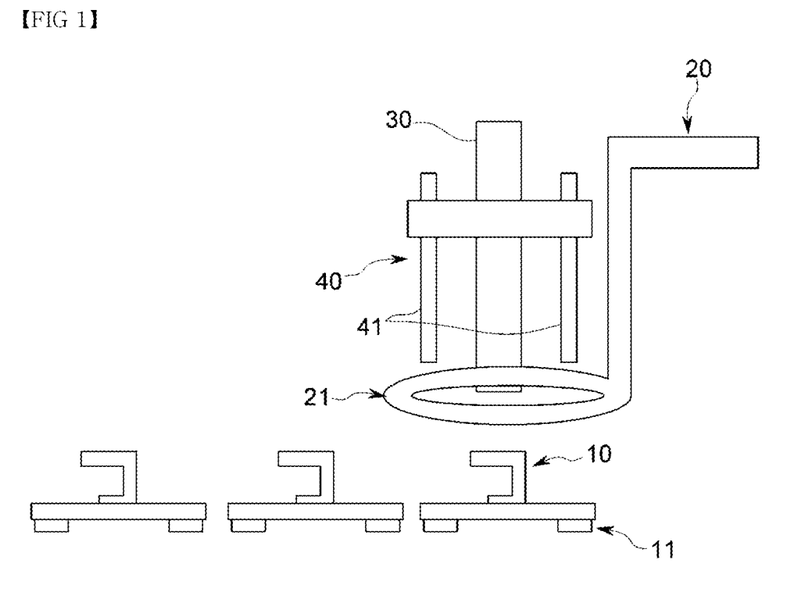
FIG. 1 is a drawing of the overall configuration of an apparatus for soldering a terminal on window glass for a vehicle according to an embodiment of the present invention.

Referring to FIG. 1, an apparatus for soldering a terminal on window glass for a vehicle according to an embodiment of the present invention comprises a terminal (10) to which a solder alloy (11) is attached, a coil unit (20) comprising a coil for generating induction heat, a gripper (30) capable of gripping and releasing the terminal and configured to be movable up and down relative to the coil unit in a state of holding the terminal, and configured to be surrounded by the coil unit to receive induction heat from the coil unit, and a ferrite core unit (40) comprising a ferrite core (41) configured to be movable up and down relative to the coil unit.

The solder alloy (11) attached to the terminal in a state of being in contact with the window glass is melted by the induction heat from the coil unit (20) and the ferrite core unit (40) such that the terminal is attached to the window glass.

Here, the ferrite core (40) may be singular, or may be composed of at least two sets.

Hereinafter, it will be described in more detail.

The solder alloy (11) is pre-attached to the lower part of the terminal (10) and the terminal (10) is transferred to the target of the window glass, the solder alloy (11) is melted, and the terminal (10) is placed on the target of the window glass.

The coil unit (20) comprises a coil (21) which is supplied with electric power and generates induction heat.

The ferrite core (41) is positioned inside the coil (21) to be movable up and down so that the induction heat can be transferred.

In the process of melting the solder (11) of the terminal (10) to place the terminal (10) on the target of the window glass, the ferrite core (41) located inside the coil (21) presses the terminal (10), and the induction heat is transferred from the induction coil (21) to the ferrite core (41) and then intensively to the solder alloy (11) under the terminal (10).

When the induction coil (21) is brought near the terminal to the solder alloy (11) to melt the solder alloy (11) as in the conventional case, the conductive layer formed on the surface of the window glass around the solder alloy (11), that is, a silver layer of the busbar, may be unnecessarily heated and broken or a crack may be formed in the glass of the window glass.

However, according to the present invention, by contacting the ferrite core (41) in the form of a bar with the terminal (10) located on the window glass while the induction coil (21) is kept at a suitable distance from the window glass so that the conductive layer on the window glass surface is not unnecessarily heated, the induction heat may be transferred intensively to the solder alloy (11) while reducing unnecessary induction heat transfer to the conductive layer on the window glass surface.

In the embodiment of FIG. 1, the induction coil (21) has a circular shape and two ferrite cores (41) are provided with a bar shape.

Figure 7:
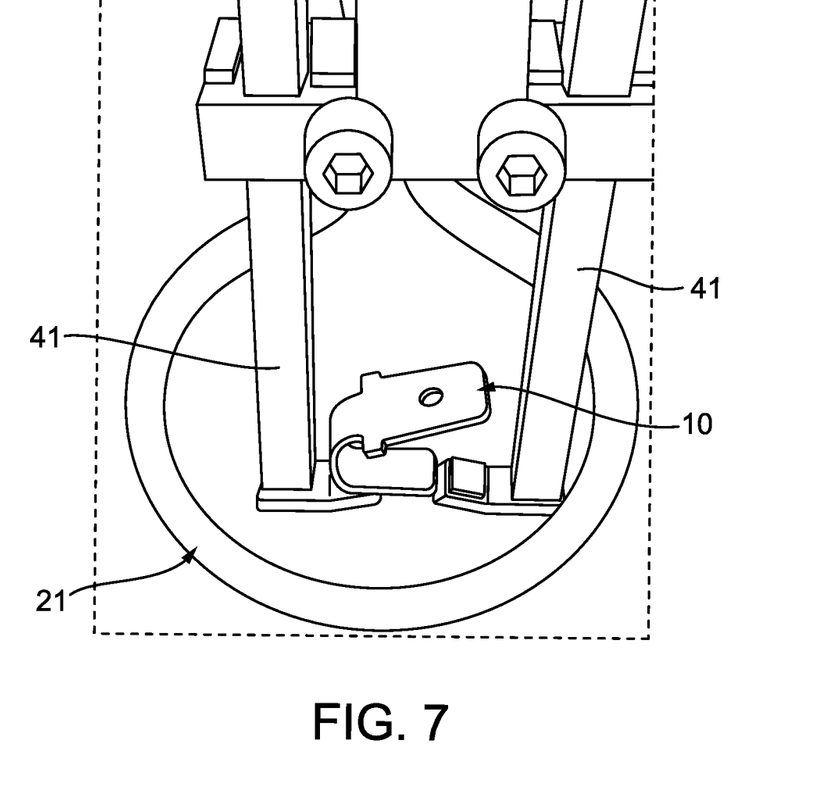
FIG. 7 is a drawing showing a state where a ferrite core located inside an induction coil of an apparatus for soldering a terminal on window glass for a vehicle according to an embodiment of the present invention is in contact with a terminal.

Referring to FIG. 7, it is preferable that the two ferrite cores (41) are located inside the circular induction coil (21) and are disposed such that the distances between the respective ferrite cores (41) and the induction coils (21) are the same to make the induction heat transferred from the coil (21) to each ferrite core (41) equal.

By doing so, it is possible to uniformize the induction heat transferred from each ferrite core (41) to each soldering alloy (11) of the terminal, thereby preventing the soldering alloy (11) from being unevenly melted.

Even when the number of ferrite cores is at least three, it is necessary to dispose the ferrite cores so that the minimum distances between the respective ferrite cores and the coils are equal to each other to uniformize the amount of induction heat transferred to each ferrite core.

Figure 8:
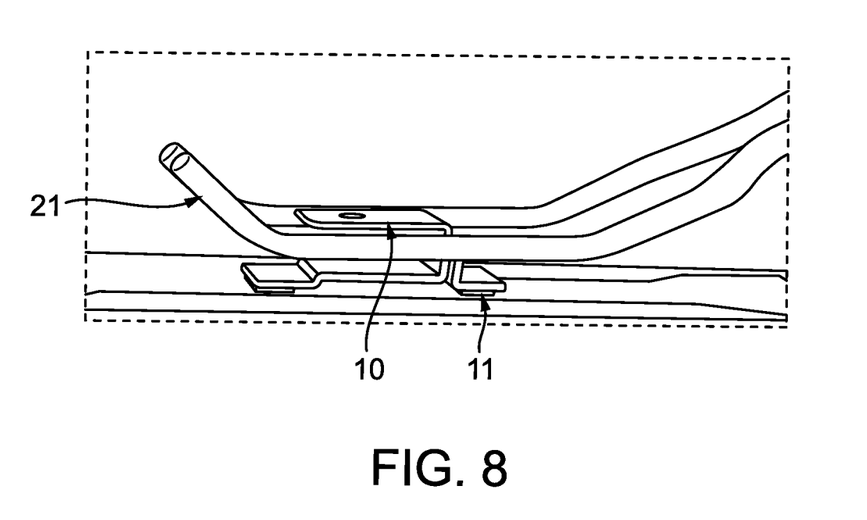
FIG. 8 is a drawing showing the shape of an induction coil of an apparatus for soldering a terminal on window glass for a vehicle according to another embodiment of the present invention.

Although the above embodiment described the case when the induction coil (21) is circular, even when the induction coil (21) is not circular as shown in FIG. 8, by disposing the ferrite cores so that the minimum distance between each of the two or more ferrite cores and the coils is the same, the amount of induction heat transferred to each ferrite core may be uniform.

If there is only one solder alloy attached to the lower part of the terminal, only one ferrite core may be provided, and in this case, the ferrite core is disposed at the center of the circular induction coil so that the induction heat from the induction coil is uniformly and efficiently transferred to the ferrite core.

If the shape of the induction coil is not circular (see FIG. 8), the ferrite core is disposed so that the distance between the coil unit facing the nearest coil and the coil unit facing the coil unit facing the nearest coil is the same, enabling uniform and efficient transfer of induction heat.

The induction coil (21), which generates induction heat, should be placed as far away from the window glass as possible to prevent unnecessary induction heat from being transferred to the window glass or onto the conductive layer (e.g. the silver layer on the busbar) formed on the window glass surface.

For this purpose, it is preferable that the induction coil (21) has a downward convex shape when viewed from the side, as in the embodiment of FIG. 8.

By doing so, cracking of the window glass due to excessive induction heating and burning of the conductive layer (e.g. silver layer on the busbar) on the glass window surface may be prevented, and the efficiency of induction heating may be increased.

The shape of the induction coil according to the embodiment of FIG. 8 will now be described in more detail.

That is, it is preferable that, with reference to the distance from the terminal (10) to the lowest part of the downwardly convex induction coil (21) during induction heating, the induction coil (21) is shaped such that the remaining part of the coil is curved upwardly to be away from the lowest part by higher than 30% of the distance.

For example, the induction coil may be formed to be curved upward in a U-shape or a V-shape.

On the other hand, when the contact area of the ferrite core (21) pressing the terminal (10) is too small, the induction heat transfer amount is reduced during the induction heating so that the solder alloy is not melted properly, and if the contact area is too large, induction heat may be unnecessarily transferred to the conductive layer formed on the surface of the window glass, that is, the silver layer of the busbar, so that the silver film may be broken or cracks may occur in the window glass.

Therefore, it is preferable that the contact area of the ferrite core while pressing the terminal is 75 to 80% of the vertically projected area of the terminal to which 75 to 80% of the vertically projected area of the terminal is applied.

On the other hand, since it is necessary to allow the induction heating to be concentrated in the solder alloy (11) of the terminal by preventing the induction heat from being transferred to the gripper (30), it is preferable that the gripper (30) is made of a material which is not influenced by induction heating. For example, it may be made of an engineering plastic material such as PEEK, or it may be made of another material that is not affected by induction heating or improves induction efficiency.

A method of soldering a terminal on window glass for a vehicle according to the present invention comprises: transferring a terminal (10) to which the solder alloy (11) is attached from a terminal supply unit to a target (50) of the window glass; securing the terminal (10) by vertical contact with a ferrite core unit (40) comprising a ferrite core (41) which is configured to be surrounded by a coil unit (20) comprising a coil (21) which generates induction heat; melting the solder alloy (11) in a state of being in contact with the window glass by the induction heat from the coil unit (20) and the ferrite core unit (40) and then placing the terminal (10) on the window glass; and removing the coil unit (20) and the ferrite core unit (40) from the terminal (10) after the solder alloy (11) is solidified.

Hereinafter, a method of soldering a terminal on window glass for a vehicle according to the present invention will be described in detail with reference to FIG. 1 to FIG. 6.

Figure 2:
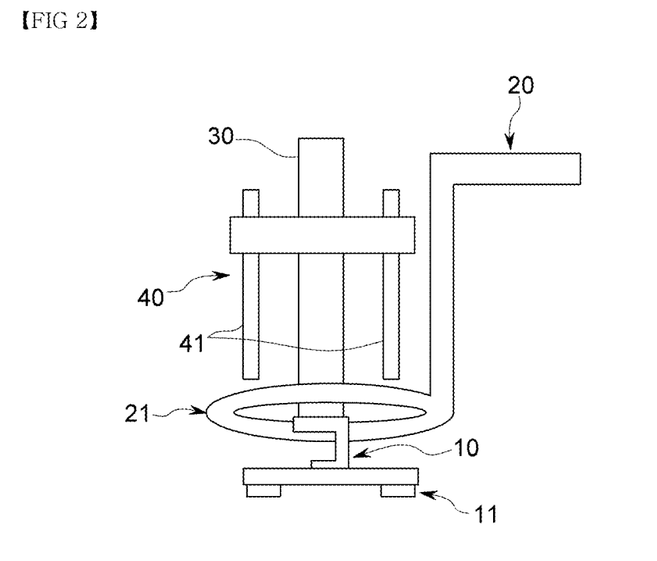
FIG. 2 to FIG. 6 are drawings sequentially illustrating a process of soldering a terminal to a window glass by an apparatus for soldering a terminal on window glass for a vehicle according to an embodiment of the present invention.
Figure 3:
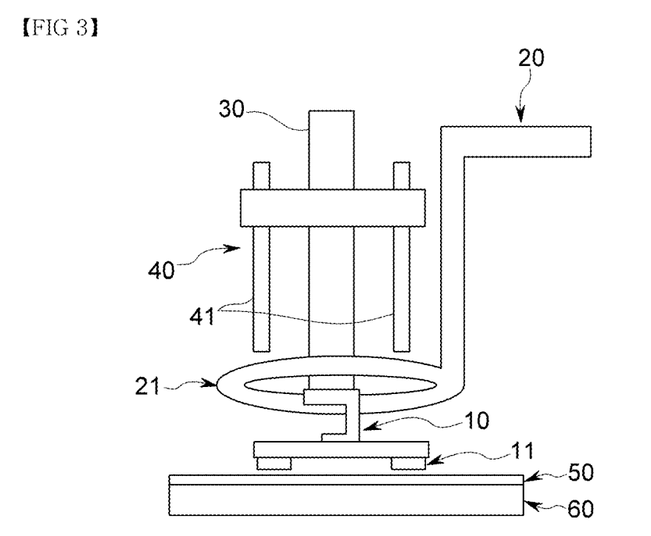

The terminal (10) to which the solder alloy (11) has been pre-attached is supplied from the terminal supply part (see FIG. 1), the induction coil unit (20) of the apparatus for soldering a terminal and the gripper (30) are lowered toward the supplied terminal, and the terminal (10) is transferred to the target (50) (e.g. a busbar) of the window glass together with the induction coil (20) and the gripper (30) after the gripper (30) grips the terminal (10) (see FIG. 2 and FIG. 3).

Figure 4:
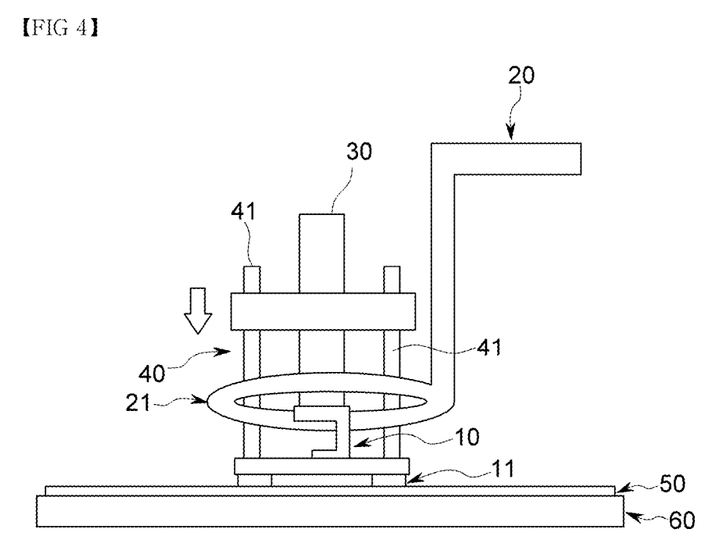

When the terminal (10) is positioned on the target (50) of the window glass, the ferrite core (41) is lowered and contacts the terminal (10) (see FIG. 4).

Figure 5:
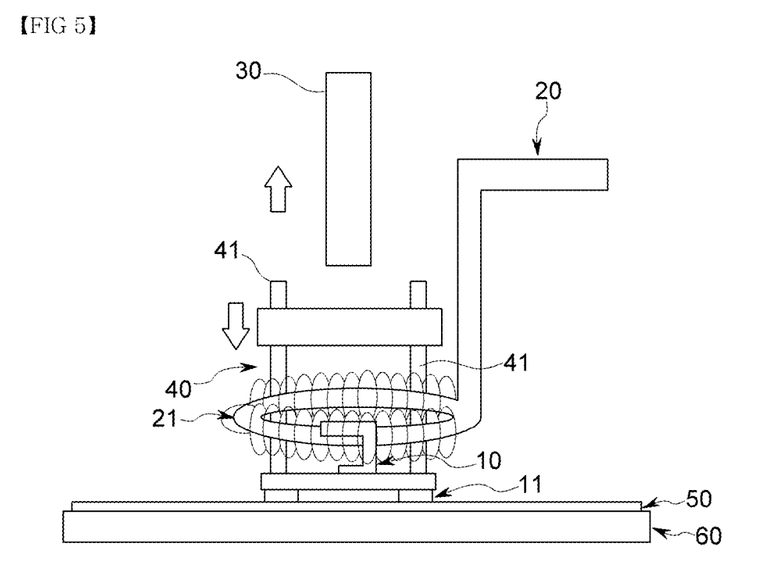

The ferrite core (41) in contact with the terminal (10) is supplied with power while the terminal (10) is pressed down and fixed in place so that the induction heat generated in the induction coil (21) is transferred to the ferrite core (41), and then transferred to the solder alloy (11) of the lower part of the terminal to melt the solder alloy (11) (see FIG. 5).

The induction heat is transferred from the induction coil (21) and the ferrite core (41) to the solder alloy (11).

Here, if the gripper (30) is made of a material that is not affected by induction heating (e.g. engineering plastic), the induction heating proceeds in a state where the gripper (30) grips the terminal (10), and if it is made of a material that is affected by induction heating (e.g. a metal), the induction heating proceeds after the gripper (30) is raised.

Figure 6:
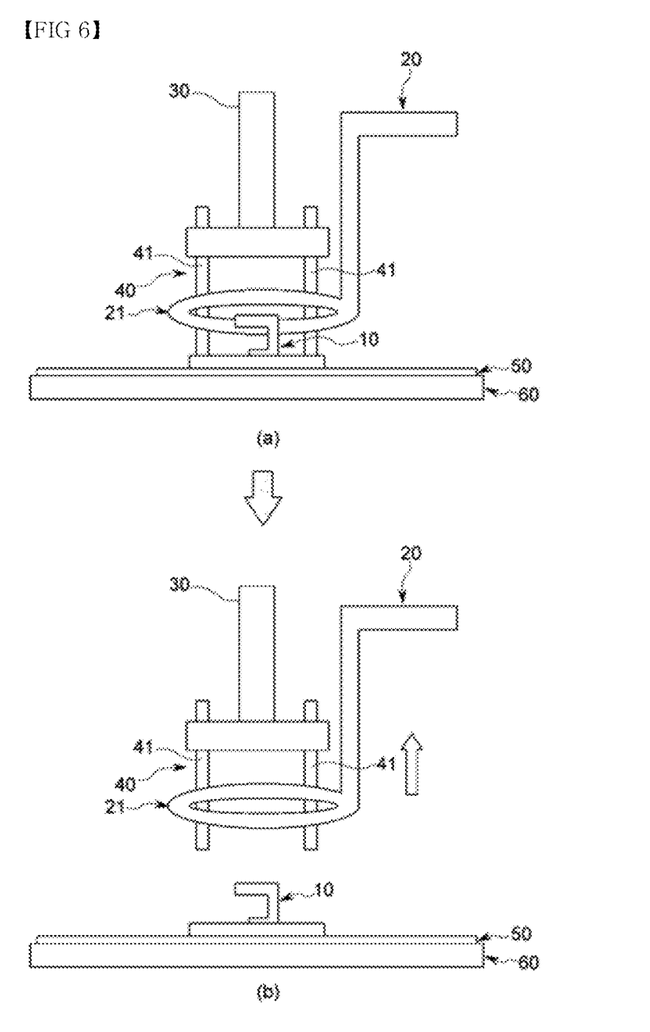

After the induction heating is completed, the ferrite core (41) remains in contact with the terminal (10) until the solder alloy (11) solidifies, and when the solder alloy (11) is completely solidified, the ferrite core (41) is raised to be apart from the terminal (10), and then the ferrite core (41) is cooled by an external cooling system (see FIG. 6).

When the above process is completed, the induction coil (21) and the ferrite core (41) return to the initial position for the next turn.

The above description is only illustrative of the technical idea of the present invention, and for those skilled in this technical field, various modifications, changes, and substitutions will be possible without departing from the essential characteristics of the present invention.

Therefore, the description is not intended to limit the scope of the present invention, and the scope of the present invention is not limited by these embodiments.

The scope of protection of the present invention should be construed according to the following claims, and all technical ideas within the scope of equivalents thereof should be construed as being included in the scope of the present invention.

| [DESCRIPTION OF SYMBOLS] | |
|---|---|
| 10: TERMINAL | 11: SOLDER ALLOY |
| 20: COIL UNIT | 21: INDUCTION COIL |
| 30: GRIPPER | |
| 40: FERRITE CORE UNIT | 41: FERRITE CORE |
| 50: TARGET | |
| 60: WINDOW GLASS | |

The invention claimed is:

1. An apparatus for soldering a terminal to which a solder alloy is attached on window glass for a vehicle, the apparatus comprising:
   a coil unit comprising a coil which generates induction heat, wherein the coil unit is kept at a distance from the window glass during soldering;

a gripper which grips and releases the terminal and is configured to be movable upward and downward relative to the coil unit in a state of gripping the terminal; and a ferrite core unit comprising a ferrite core which is configured to be surrounded by the coil unit to receive the induction heat, and is configured to be movable upward and downward relative to the coil unit, wherein the solder alloy attached to the terminal in a state of being in contact with the window glass is melted by the induction heat from the coil unit and the ferrite core unit such that the terminal is attached to the window glass.

2. The apparatus of claim 1, wherein the solder alloy attached to the terminal is melted by the induction heat while the ferrite core unit presses the terminal.

3. The apparatus of claim 1, wherein the coil unit comprises one coil and the ferrite core unit comprises one ferrite core.

4. The apparatus of claim 1, wherein when the ferrite core unit comprises at least two ferrite cores, the at least two ferrite cores are disposed such that minimum distances between each ferrite core and the coil are the same.

5. The apparatus of claim 1, wherein the ferrite core unit comprises one ferrite core.

6. The apparatus of claim 1, wherein the coil is downwardly convex when viewed laterally.

7. The apparatus of claim 2, wherein the area of the terminal that the ferrite core unit presses and contacts is 75~80% of the vertically projected area of the terminal.

8. The apparatus of claim 1, wherein the gripper is made of a plastic material which is not affected by the induction heat.

9. A method of soldering a terminal on window glass for a vehicle, the method comprising:

transferring a terminal to which a solder alloy is attached from a terminal supply unit to a target of the window glass;

securing the terminal by vertical contact with a ferrite core unit comprising a ferrite core which is configured to be surrounded by a coil unit comprising a coil which generates induction heat, and the ferrite core unit is configured to be movable upward and downward relative to the coil unit;

melting the solder alloy, in a state of being in contact with the window glass, by the induction heat from the coil unit and the ferrite core unit and then placing the terminal on the window glass, wherein the coil unit is kept at a suitable distance from the window glass during soldering; and removing the coil unit and the ferrite core unit from the terminal after the solder alloy is solidified.

10. The method of claim 9, wherein the coil unit comprises one coil, and the ferrite core unit comprises one ferrite core.

11. The method of claim 9 wherein when the ferrite core unit comprises at least two ferrite cores, the at least two ferrite cores are disposed such that a minimum distance between each ferrite core and the coil are the same.

12. The method of claim 9, wherein the ferrite core unit comprises one ferrite core.

13. The method of claim 9, wherein the coil is downwardly convex when viewed laterally.

14. The method of claim 9, wherein the area of the terminal that the ferrite core unit presses and contacts is 75~80% of the vertically projected area of the terminal.

15. The method of claim 9, wherein the gripper is made of a plastic material which is not affected by the induction heat.

16. The apparatus of claim 1, wherein the ferrite core unit is movable relative to the gripper.

17. The method of claim 9, wherein the transferring is carried out with a gripper and the ferrite core unit is movable relative to the gripper.

* * * * *